(12) United States Patent
Chang et al.

(10) Patent No.: US 7,928,963 B2
(45) Date of Patent: Apr. 19, 2011

(54) INPUT DEVICE

(75) Inventors: Ching-Sung Chang, Taipei (TW); David Ho, Taipei (TW); Steven Tseng, Taipei (TW); An-Ping Yang, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 885 days.

(21) Appl. No.: 11/896,421

(22) Filed: Aug. 31, 2007

(65) Prior Publication Data

US 2008/0192012 A1    Aug. 14, 2008

(30) Foreign Application Priority Data

Feb. 14, 2007 (TW) ................................ 96202871 U

(51) Int. Cl.
*G09G 5/00* (2006.01)
(52) U.S. Cl. ................. 345/169; 345/156; 345/168
(58) Field of Classification Search .............. 345/156, 345/168, 169
See application file for complete search history.

(56) References Cited

U.S. PATENT DOCUMENTS

| | | | | |
|---|---|---|---|---|
| 5,265,274 A * | 11/1993 | Knutson et al. | ........... | 455/347 |
| 7,369,064 B2 * | 5/2008 | Yeh | ........... | 341/22 |
| 7,489,301 B2 * | 2/2009 | Chen et al. | ........... | 345/168 |
| 7,688,311 B2 * | 3/2010 | Fyke et al. | ........... | 345/169 |
| 2003/0098853 A1 * | 5/2003 | Ladouceur et al. | ........... | 345/168 |
| 2003/0160712 A1 * | 8/2003 | Levy | ........... | 341/22 |
| 2004/0069600 A1 * | 4/2004 | Xie | ........... | 200/5 R |
| 2004/0165924 A1 * | 8/2004 | Griffin | ........... | 400/486 |
| 2004/0189607 A1 * | 9/2004 | Afanasiev | ........... | 345/168 |
| 2005/0052419 A1 * | 3/2005 | Burroughs | ........... | 345/168 |
| 2005/0073446 A1 * | 4/2005 | Lazaridis et al. | ........... | 341/22 |
| 2005/0125570 A1 * | 6/2005 | Olodort et al. | ........... | 710/15 |
| 2005/0231395 A1 * | 10/2005 | Shipman | ........... | 341/22 |
| 2005/0266872 A1 * | 12/2005 | MacIntosh et al. | ........... | 455/550.1 |
| 2006/0022947 A1 * | 2/2006 | Griffin et al. | ........... | 345/168 |
| 2006/0132458 A1 * | 6/2006 | Garfio et al. | ........... | 345/173 |
| 2008/0018606 A1 * | 1/2008 | Chen | ........... | 345/169 |

* cited by examiner

*Primary Examiner* — Amare Mengistu
*Assistant Examiner* — Premal Patel
(74) *Attorney, Agent, or Firm* — Birch, Stewart, Kolasch & Birch, LLP

(57) ABSTRACT

An input device constructed in a carrier electronic apparatus comprises a letter button module and a number button module. The letter button module has a plurality of letter buttons to represent different letters respectively, and the number button module has a plurality of number buttons to represent different numbers respectively. The number buttons are separated from the letter buttons by being located in the intervals formed by adjacent rows of the letter buttons. The size, form, and color of the number buttons are different to those of the letter buttons.

10 Claims, 4 Drawing Sheets

INPUT DEVICE

This application claims the benefit of Taiwan Patent Application Serial No. 96202871, filed Feb. 14, 2007, the subject matter of which is incorporated herein by reference.

FIELD OF THE INVENTION

The invention relates to an input device, and more particularly to the input device applied to a mobile electronic apparatus.

BACKGROUND OF THE INVENTION

Please refer to FIG. 1, it shows schematically a front view of a keyboard of personal digital assistant in prior art. As usual, a qwerty keyboard 4 of a personal digital assistant 2 (PDA) has about thirty-five to forty isolated buttons, and each of the buttons 402 is corresponding to a letter 6 in English alphabet or Chinese alphabet, such like A, B, C, or ㄅ,ㄆ, ㄇrespectively. The arrangement of the qwerty keyboard 4 having 35-40 keys can also be the same as that of a conventional 101-key keyboard. Some specific buttons (i.e., the dual-function buttons) of the qwerty keyboard 4 may be functioned at the same button to represent both a letter button 402 and a number button 404, due to the limited surface area of the PDA 2. It is usually inconvenient to switch these dual-function buttons between the letter functions and the number functions, while users operate the PDA 2.

The switched operation on the qwerty keyboard is not quite easy as it presents, especially when it is applied to the mobile phone which has only twelve buttons.

Some qwerty keyboards have isolated number buttons arranged in a top row of the keyboard or around a side of the PDA 2. However, since user is costumed to performing a thumb-inputting operation on the qwerty keyboard, the above-mentioned qwerty keyboard is still cumbersome for the user to introduce the number function therefrom. Definitely, it is inevitable to expect operation or input errors from operating dual-function buttons in the qwerty keyboard.

Therefore, an improved input device without trading off the user comfort is definitely popular to the skilled person in the art.

SUMMARY OF THE INVENTION

Accordingly, it is an object of the present invention to provide an input device that introduces surface structural changes to meet various input ergonomics so as to ease the operations of the input device.

The input device constructed in a portable electronic apparatus comprises a letter button module and a number button module. The letter button module has a plurality of letter buttons arranged into a plurality of rows (letter rows) to represent different letters respectively. There are intervals between every two adjacent rows. The number button module has a plurality of number buttons arranged into respective rows between the letter rows to represent different numbers respectively. That is to say that the number buttons are set in the intervals of the adjacent rows of the letter buttons and particularly located in the center of the input device. The size, form, and color of the number buttons are different from the letter buttons. The arrangement of the number buttons can be the same as the conventional arrangement of the twelve number buttons in a typical mobile phone.

By providing the input device of the present invention, each of the number buttons disposed in the interval of the adjacent letter buttons can be operated more conveniently without any additional switching, and the number button module located in the center of the input device can be much comfortable to the user.

BRIEF DESCRIPTION OF THE DRAWINGS

The features, objects, and advantages of the present invention will become more apparent from the following detailed description of the preferred embodiment of this invention, with reference to the accompanying drawings, in which.

DETAILED DESCRIPTIONS OF THE PREFERRED EMBODIMENT

Figure 1:
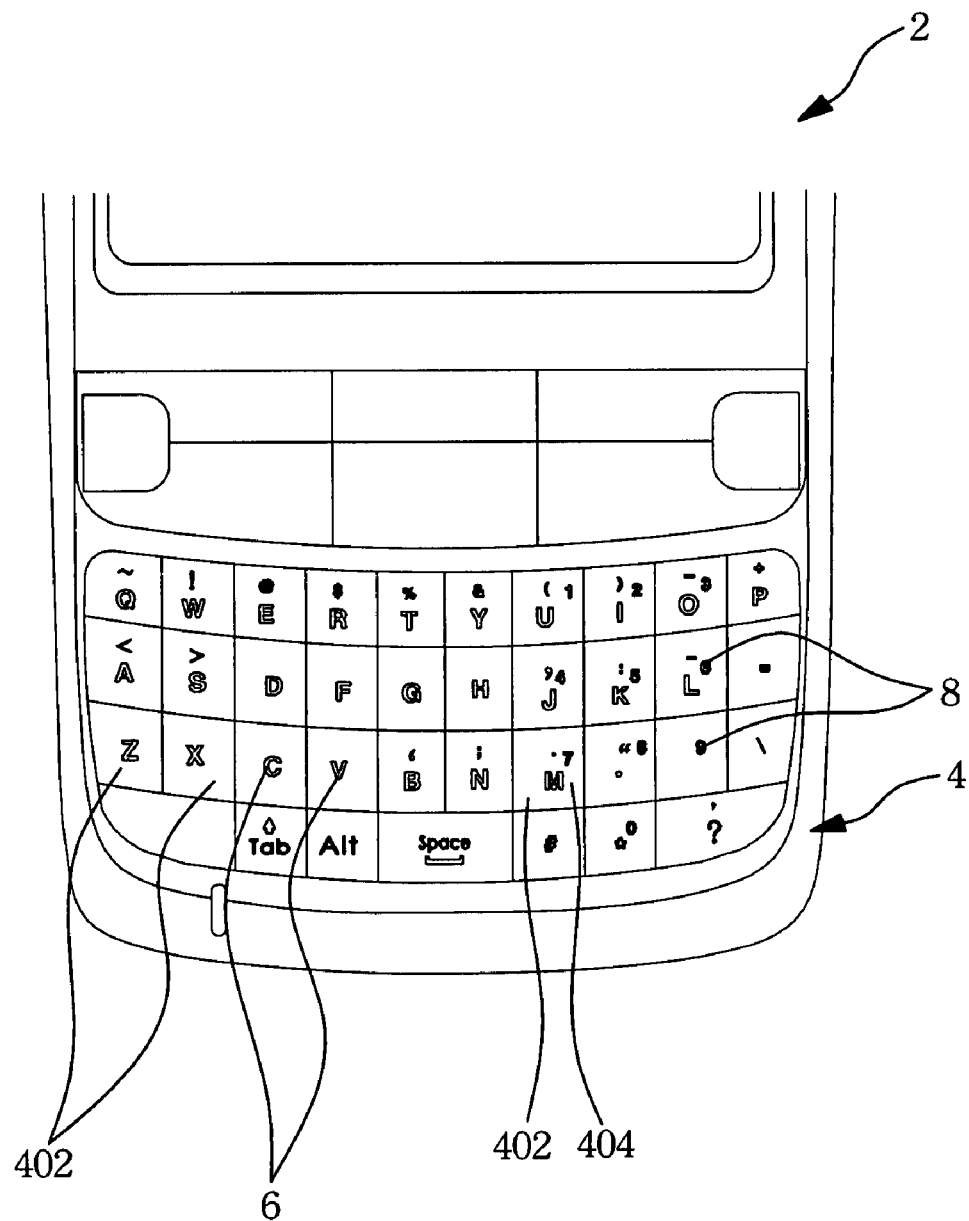
FIG. 1 is a front view of a conventional qwerty keyboard of a typical PDA.
Figure 2:
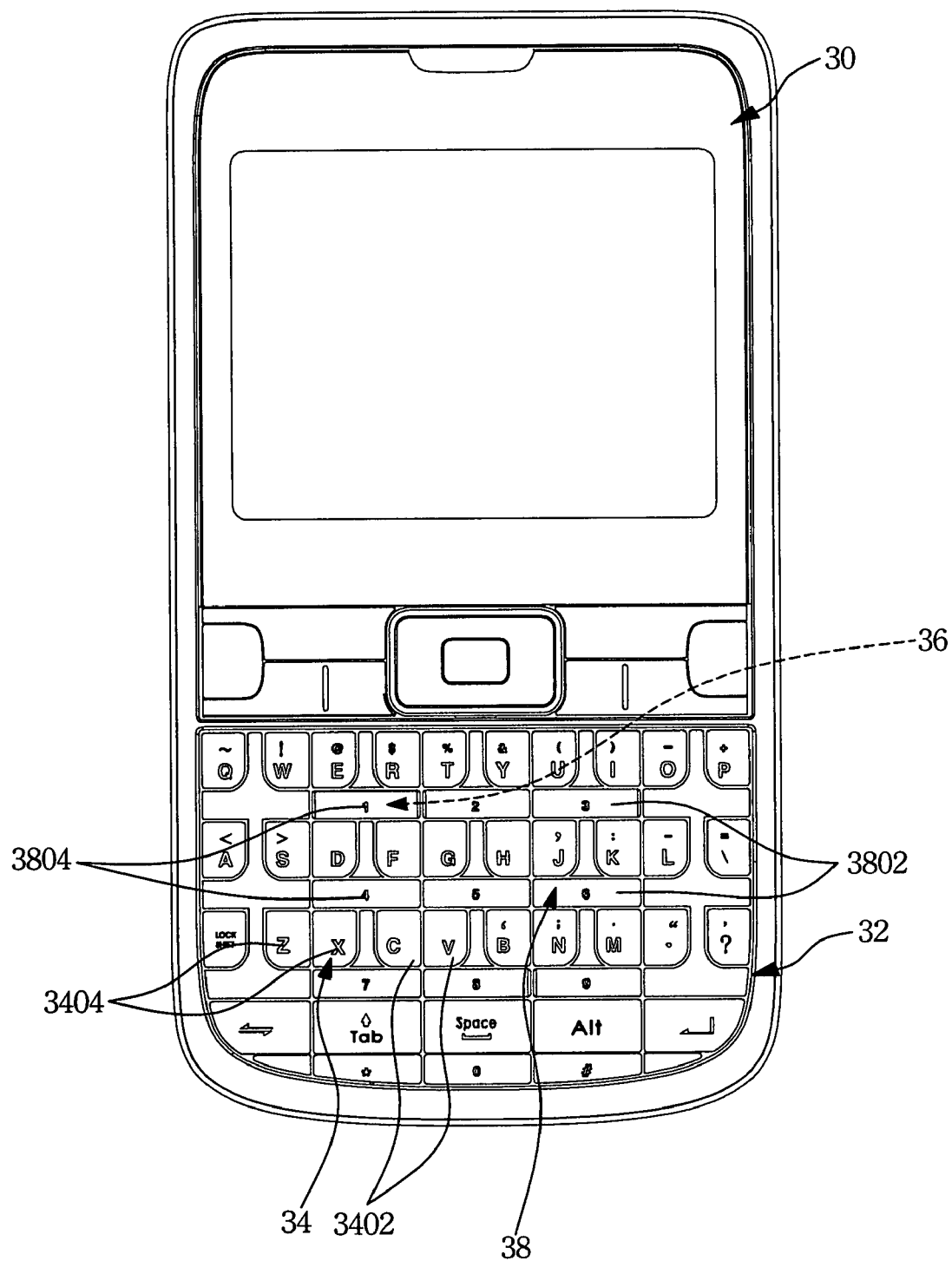
FIG. 2 is a front view of a preferred input device of an electronic apparatus in accordance with the present invention.

Please refer to FIG. 2, it shows a front view of a preferred input device 32 of an electronic apparatus 30 in accordance with the present invention. The input device 32 is mounted in an electronic apparatus 30 that can be a mobile phone, a personal digital assistant, an MP3 player, or any the like. In the present invention, the input device 32 comprises a letter button module 34 and a number button module 38, wherein the letter button module 34 and the number button module 38 are set at the same layer.

The letter button module 34 consists of a plurality of letter buttons 3402 which represent different letters respectively, and the letter buttons 3402 are arranged into respective rows according to a conventional qwerty-keyboard arrangement. As shown, every two adjacent rows have an interval 36 there between. The number button module 38 consists of a plurality of number buttons 3802 which represent different numbers 3804 respectively and are positioned into the interval 36 between the rows of the letter buttons 3402. The number buttons 3802 are preferably set in the center of the input device 32.

The mentioned characteristics of the input device 32 can be applied to various embodiments. For example, one is that the letter buttons 3402 can be arranged into a pattern similar to the conventional qwerty keyboard, and the other can be that the letter buttons 3402 can be arranged into another pattern similar to the keyboard of the current mobile phone. In either example, each number button 3802 of the number button module 38 can be positioned in the interval 36 between the letter buttons 3402.

It is noticed that each of the letter buttons 3402 is corresponding to an alphabetic letter, such as A, B, C, ㄅ, ㄆ, or ㄇ, no matter what kinds of the letter button module 34. The letter buttons 3402 can further correspond to the function symbols; for instance, "!", "$", "%", "&" and so on.

As shown in FIG. 2, the number buttons 3802 of the number button module 38 have twelve buttons totally to represent number zero to number nine, the sign "*", and the sign "#", respectively. The arrangement of the number buttons 3802 is like the arrangement of the buttons on the traditional mobile phone 2. The number button module 38 is set in the center of the input device 32 on the electronic apparatus 30, and each of the number buttons 3802 is positioned in the interval 36 between two adjacent rows of the letter buttons 3402.

The shape of the number buttons 3802 is long and narrow along a horizontal direction as shown in FIG. 2, and is different from the normal shape of the letter buttons 3402. Furthermore, the color of the number button module 38 can be different to that of the letter button module 34, such that the users can tell the letter buttons 3402 from the number buttons 3802 quickly.

Figure 3:
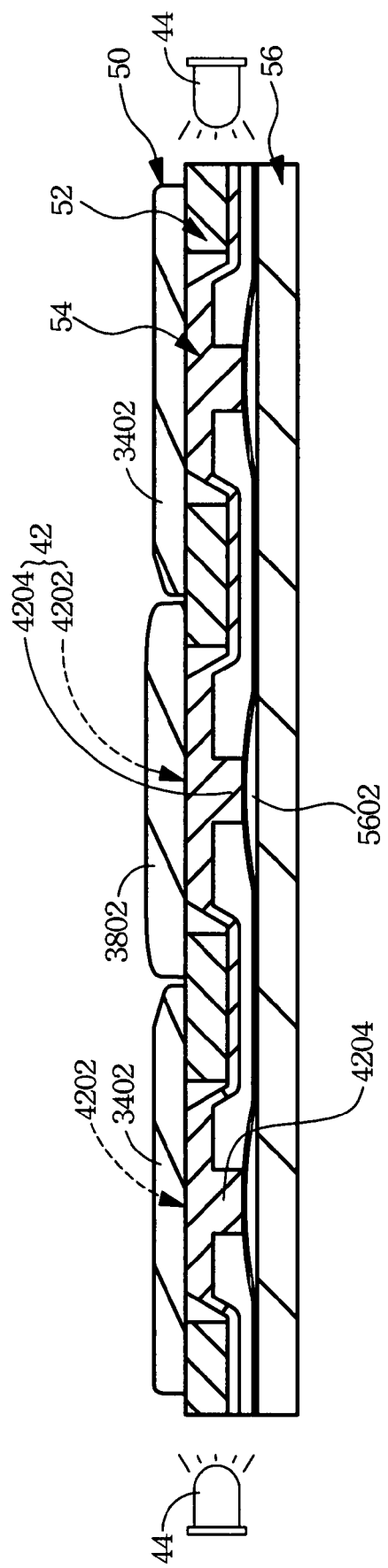
FIG. 3 is a cross section view of the input device of the present invention.
Figure 4:
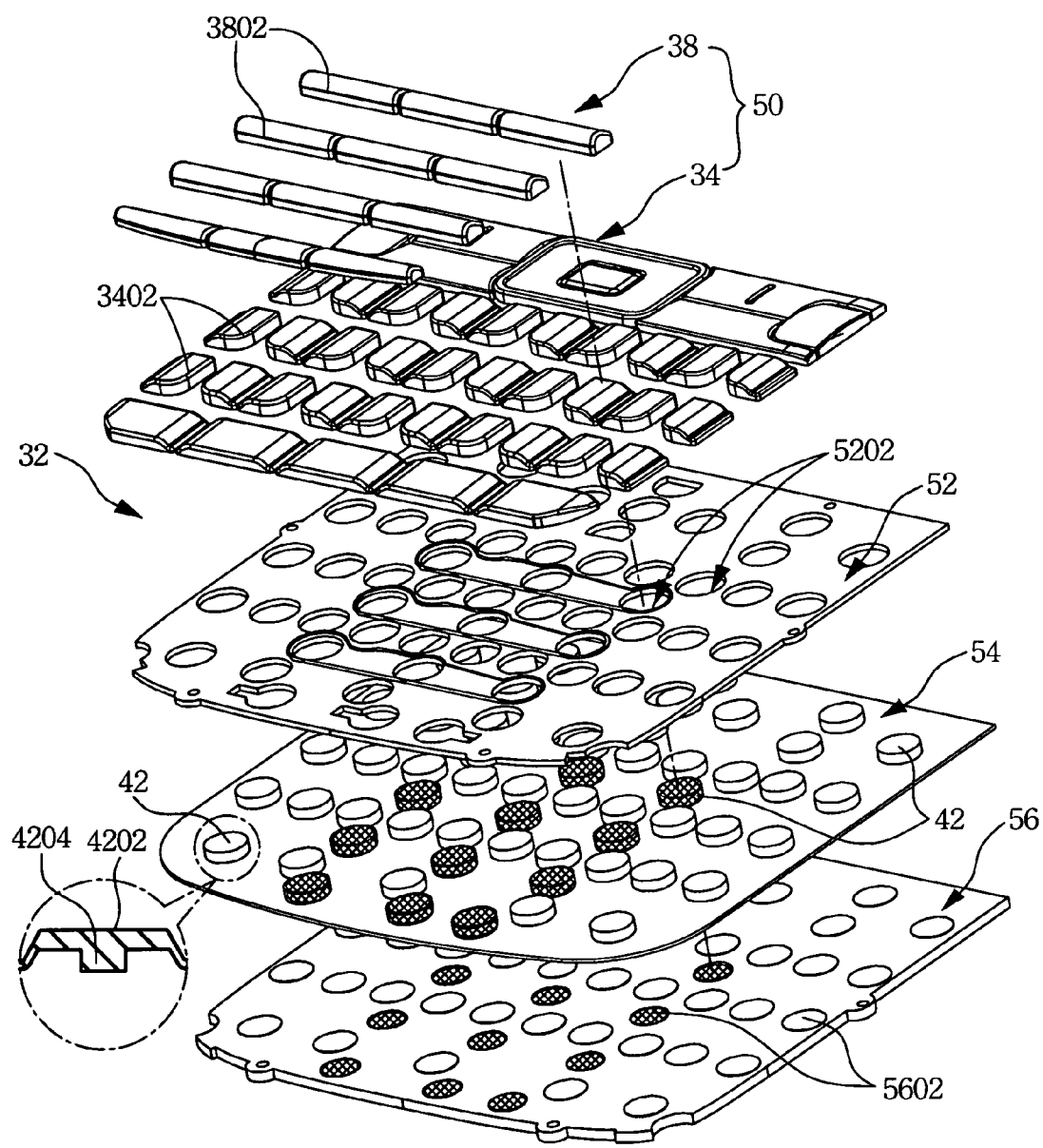
FIG. 4 is an exploded view of the input device of the present invention.

Referring now to both FIG. 3 and FIG. 4, a cross section view of the input device of the present invention and an exploded view of the input device are shown, respectively. The input device is mounted on the surface of the electronic apparatus and comprises a button layer 50, a support layer 52, a buffer layer (cushion) 54 and a printed circuit board (PCB) 56.

As illustrated, the button layer 50 is an input interface between the input device and users. The button layer or the button unit 50 comprises the number button module 38 and the letter button module 34, and can be made of a plastic, a rubber, or a thermoplastic polyurethane pellet (TPU).

The support layer 52 can also be formed as a support grid for providing sufficient strength to support the structure of the button unit 50. The support grid 52, having a plurality of through holes 5202, is set under the button unit 50. The through holes 5202 of the support grid 52 are opposite to the letter buttons 3402 and the number buttons 3802.

The buffer layer (cushion) 54 is made of a flexible material such as a rubber or a TPU to enhance the elasticity of the button unit 50. The buffer layer 54 is set under the support grid 52, and has a plurality of prominent pillars 42, whose locations are corresponding to the through hole 5202. The upper surface 4202 of the pillar 42 touches the lower surface of the button unit 50 by passing the pillar 42 through the through hole 5202. Each prominent pillar 42 has a downward extended pressing column 4204 to stand on a metal dome 5602.

The printed circuit board 56 is set under the buffer layer 54 and has a plurality of metal domes 5602. The position of the metal dome 5602 is located under the position of the respective pressing column 4204. When the users press any number button 3802 or any letter button 3402, the pressing column 4204 can depress the metal dome 5602 respectively so as to generate a corresponding signal. Then, the signal can transmit to a chip or a microprocessor to further animate the corresponding number or letter.

The support layer 52 can be made of a transparent plastic material. The electronic apparatus 30 further comprises a light emitting diode (LED) lamp 44 at least. The light of the LED lamp 44 can be guided to the number buttons 3802 and the letters buttons 3402 by the support layer 52. Preferably, the electronic apparatus 30 has two different colors of LED lamps, one color light of the LED lamp is guided to the letter buttons 3402 by the support layer 52, and the other color light of the LED lamp is guided to the number buttons 3802 by the support layer 52. Thereby, the vision of the number buttons 3802 can be different to that of the letters buttons 3402.

By providing the present invention, the number buttons of the number button module are set in the interval between the adjacent rows of the letter buttons of the input device, the number button module are distributed in the center of the input device, and the convenience for operating the button unit of the input device can then be enhanced without the notorious switching.

Although the present invention and its advantages have been described in detail, as well as some variations over the disclosed embodiments, it should be understood that various other switches, substitutions and alterations can be made herein without departing from the spirit and scope of the invention as defined by the appended claims.

What is claimed is:

1. An input device applied to a mobile electronic apparatus comprising:
   a button layer, comprising:
      a letter button module, having a plurality of letter buttons to represent different letters respectively, the letter buttons being arranged into a plurality of rows, wherein every two adjacent said rows has a respective interval; and
      a number button module, having a plurality of number buttons to represent different numbers respectively, the number buttons being arranged into a plurality of rows, wherein each said row of said number button module disposed in the respective interval between the adjacent said rows of said letter button module,
      wherein the number buttons are different in shape from the letter buttons;
   a support layer formed to provide strength to support the button layer, said support layer comprising a plurality of through holes arranged under the button layer and opposite to the letter buttons and the number buttons; and
   a buffer layer used to enhance elasticity of the button layer, said buffer layer being arranged under the support layer and having a plurality of prominent pillars located corresponding to the through holes, wherein said pillars pass through the through holes to touch the button layer, and each of the pillars has a downward extended pressing column to stand on a metal dome on a printed circuit board located under the buffer layer.

2. The input device according to claim 1, wherein each said letter button represents an alphabetic letter.

3. The input device according to claim 1, wherein said number buttons represent number zero to number nine, the sign "*", and the sign "#" respectively.

4. The input device according to claim 1, wherein said number button module is located in a center of said input device.

5. The input device according to claim 1, further comprising at least an LED lamp, said support layer guiding a light of said LED lamp to said letter buttons and said number buttons.

6. The input device according to claim 1, wherein a color of said number buttons is different to another color of said letter buttons.

7. The input device according to claim 1, wherein the mobile electronic apparatus is a mobile phone.

8. The input device according to claim 1, wherein said letter button module is arranged in accordance with an arrangement of a qwerty keyboard.

9. The input device according to claim 1, wherein said letter button is block-shaped and said number button is strip-shaped.

10. The input device according to claim 1, said mobile electronic apparatus comprising two LED lamps, wherein one color light of one of the LED lamps is to be guided to said letter buttons by said support layer and a different color light of the other LED lamp is to be guided to said number buttons by said support layer.

* * * * *